US012562397B2

(12) United States Patent
Woo

(10) Patent No.: US 12,562,397 B2
(45) Date of Patent: Feb. 24, 2026

(54) FUEL CELL STACK AND CLAMP

(71) Applicants: HYUNDAI MOTOR COMPANY,
Seoul (KR); Kia Corporation, Seoul
(KR)

(72) Inventor: Myeong Nam Woo, Yongin-si (KR)

(73) Assignees: HYUNDAI MOTOR COMPANY,
Seoul (KR); Kia Corporation, Seoul
(KR)

( * ) Notice: Subject to any disclaimer, the term of this
patent is extended or adjusted under 35
U.S.C. 154(b) by 633 days.

(21) Appl. No.: 18/071,983

(22) Filed: Nov. 30, 2022

(65) Prior Publication Data

US 2023/0268543 A1 Aug. 24, 2023

(30) Foreign Application Priority Data

Feb. 23, 2022 (KR) ........................ 10-2022-0023584
Feb. 23, 2022 (KR) ........................ 10-2022-0023585

(51) Int. Cl.
*H01M 8/248* (2016.01)
*H01M 8/2418* (2016.01)
*H01M 8/2475* (2016.01)

(52) U.S. Cl.
CPC ......... *H01M 8/248* (2013.01); *H01M 8/2418*
(2016.02); *H01M 8/2475* (2013.01)

(58) Field of Classification Search
CPC ... H01M 8/248; H01M 8/2418; H01M 8/2475
See application file for complete search history.

(56) References Cited

U.S. PATENT DOCUMENTS

2009/0214928 A1* 8/2009 Kim ...................... H01M 8/247
429/434

* cited by examiner

*Primary Examiner* — Eugenia Wang
(74) *Attorney, Agent, or Firm* — MORGAN, LEWIS &
BOCKIUS LLP

(57) ABSTRACT

A fuel cell stack includes a reaction part configured by
stacking a plurality of unit cells, a plurality of endplates
configured to cover ends of the reaction part in a stacking
direction of the unit cells, and a clamp including a clamp
body configured to cover an outer surface of the reaction part
in the stacking direction of the unit cell and a plurality of
hook portions connected to ends of the clamp body so as to
cover outer surfaces of the plurality of endplates and be
restricted directly by the endplates.

7 Claims, 12 Drawing Sheets

10'

FUEL CELL STACK AND CLAMP

CROSS-REFERENCE TO RELATED APPLICATION

This application claims priority to and the benefit under 35 USC § 119(a) of Korean Patent Application Nos. 10-2022-0023584 and 10-2022-0023585 filed in the Korean Intellectual Property Office on Feb. 23, 2022, the entire disclosure of which are incorporated herein by reference for all purposes.

BACKGROUND

1. Field

The present disclosure relates to manufacturing process and an apparatus for a fuel cell stack and a clamp.

2. Description of Related Art

A fuel cell stack refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may include a membrane electrode assembly (MEA) having an electrolyte membrane configured to allow hydrogen positive ions to move therethrough, and electrodes (catalyst electrode layers) provided on two opposite surfaces of the electrolyte membrane and configured to enable a reaction between hydrogen and oxygen. The fuel cell may also include gas diffusion layers (GDLs) disposed to be in close contact with two opposite surfaces of the membrane electrode assembly and configured to distribute reactant gases and transfer the generated electrical energy, and separators (bipolar plates) disposed to be in close contact with the gas diffusion layers and configured to define flow paths.

In addition, a pair of endplates is provided and connected by means of a fastening member (strap) at two opposite ends of the plurality of fuel cells constituting the fuel cell stack. The fuel cells may be supported by the endplates to maintain surface pressures thereof (a friction contact state may be maintained).

SUMMARY

In one general aspect, here is provided a fuel cell stack including a reaction part configured by stacking a plurality of unit cells, a plurality of endplates configured to cover ends of the reaction part in a stacking direction of the unit cells, and a clamp including a clamp body configured to cover an outer surface of the reaction part in the stacking direction of the unit cell and a plurality of hook portions connected to ends of the clamp body so as to cover outer surfaces of the plurality of endplates and be bound by the endplates.

Each endplate of the plurality of endplates may include a catching groove defined therein. The plurality of hook portions each include a catching protrusion provided on an inner surface of the hook portion facing the endplate, the catching protrusion being configured to be accommodated in the catching groove. The plurality of hook portions may each be bound by the endplate by the catching protrusion and the catching groove.

The catching protrusion may be integrated with the plurality of hook portions by partially processing a part of a respective hook portion of the plurality of hook portions.

The catching protrusion may be connected to a respective hook portion of the plurality of hook portions and is configured to be elastically movable from a first position at which the catching protrusion is accommodated in the catching groove to a second position at which the catching protrusion is withdrawn out of the catching groove.

The fuel cell may also include an edge restriction part provided on the outer surface of each of the plurality of endplates and configured to cover an edge of a respective hook portion of the plurality of hook portions. An edge accommodation space is defined between the edge restriction part and a respective endplate and accommodates the edge of the respective hook portion.

The edge restriction part may include a distal end restriction portion configured to cover a distal end of the respective hook portion, a first lateral end restriction portion configured to cover a first lateral end of the respective hook portion, and a second lateral end restriction portion configured to cover a second lateral end of the respective hook portion. The distal end restriction portion, the first lateral end restriction portion, and the second lateral end restriction portion may collectively define the edge accommodation space.

The fuel cell stack may also include a first inclined guide portion provided on an outer surface of the distal end of the respective hook portion and configured to guide the respective hook portion to the edge accommodation space.

The fuel cell stack may also include a second inclined guide portion provided on an inner surface of the distal end of the respective hook portion and configured to guide the respective hook portion to the edge accommodation space.

In another general aspect, here is provided a clamp for a fuel cell stack including a reaction part configured by stacking a plurality of unit cells, a plurality of endplates, each endplate of the plurality of endplates being configured to cover ends of the reaction part in a stacking direction of the unit cells, a clamp body configured to cover an outer surface of the reaction part in the stacking direction of the unit cell, and a plurality of hook portions connected to ends of the clamp body so as to cover outer surfaces of the plurality of endplates and being bound by the endplates.

A catching groove is defined in the each of the plurality of endplates and each endplate may include a catching protrusion provided on an inner surface of the hook portion facing the endplate, the catching protrusion being configured to be accommodated in the catching groove, and the plurality of hook portions are each bound by the endplate by the catching protrusion and the catching groove.

The catching protrusion is integrated with the hook portion by partially processing a part of a respective hook portion of the plurality of hook portions.

The catching protrusion is connected to the hook portion and is configured to be elastically movable from a first position at which the catching protrusion is accommodated in the catching groove to a second position at which the catching protrusion is withdrawn out of the catching groove.

The clamp may also include an edge restriction part provided on the outer surface of each of the plurality of endplates and configured to cover an edge of a respective hook portion of the plurality of hook portions, and an edge accommodation space may be defined between the edge restriction part and a respective endplate and accommodates the edge of the respective hook portion.

The edge restriction part may include a distal end restriction portion configured to cover a distal end of the respective hook portion, a first lateral end restriction portion configured to cover a first lateral end of the respective hook portion, and a second lateral end restriction portion configured to cover a second lateral end of the respective hook portion, and the distal end restriction portion, the first lateral end restriction portion, and the second lateral end restriction portion may collectively define the edge accommodation space.

The clamp may further include a first inclined guide portion provided on an outer surface of the distal end of the respective hook portion and configured to guide the respective hook portion to the edge accommodation space.

The clamp may further include a second inclined guide portion provided on an inner surface of the distal end of the respective hook portion and configured to guide the respective hook portion to the edge accommodation space.

Figure 1:
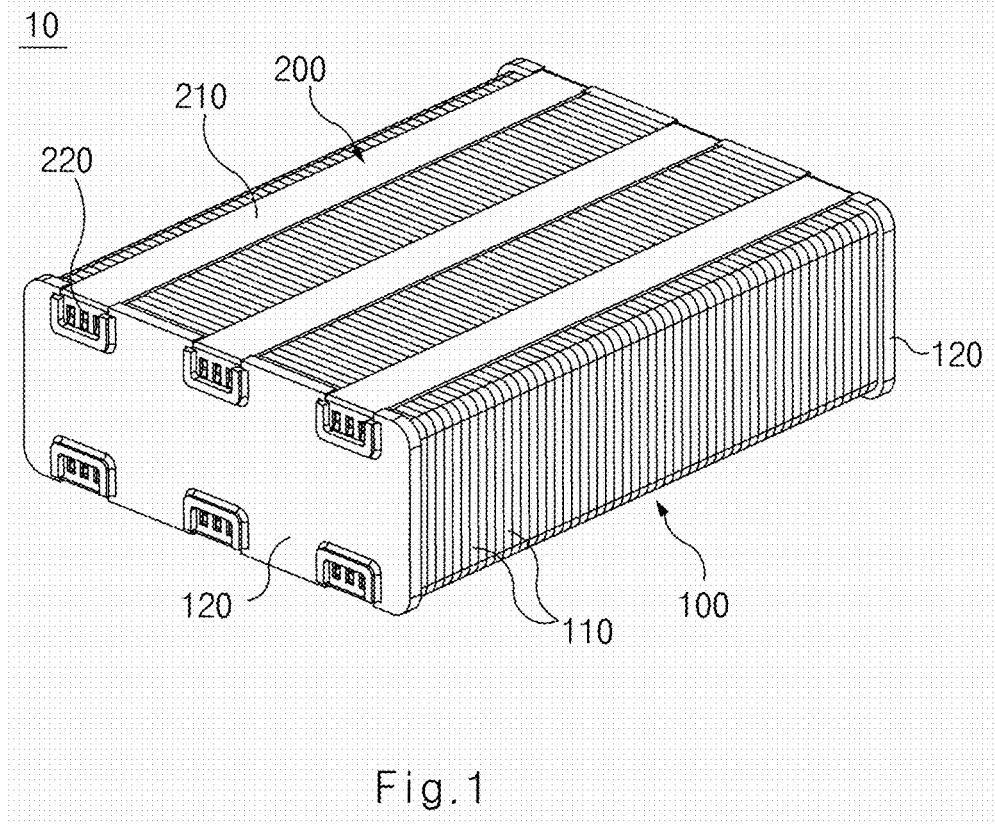
FIG. 1 is a for explaining a fuel cell stack according to a first embodiment of the present disclosure.
Figure 2:
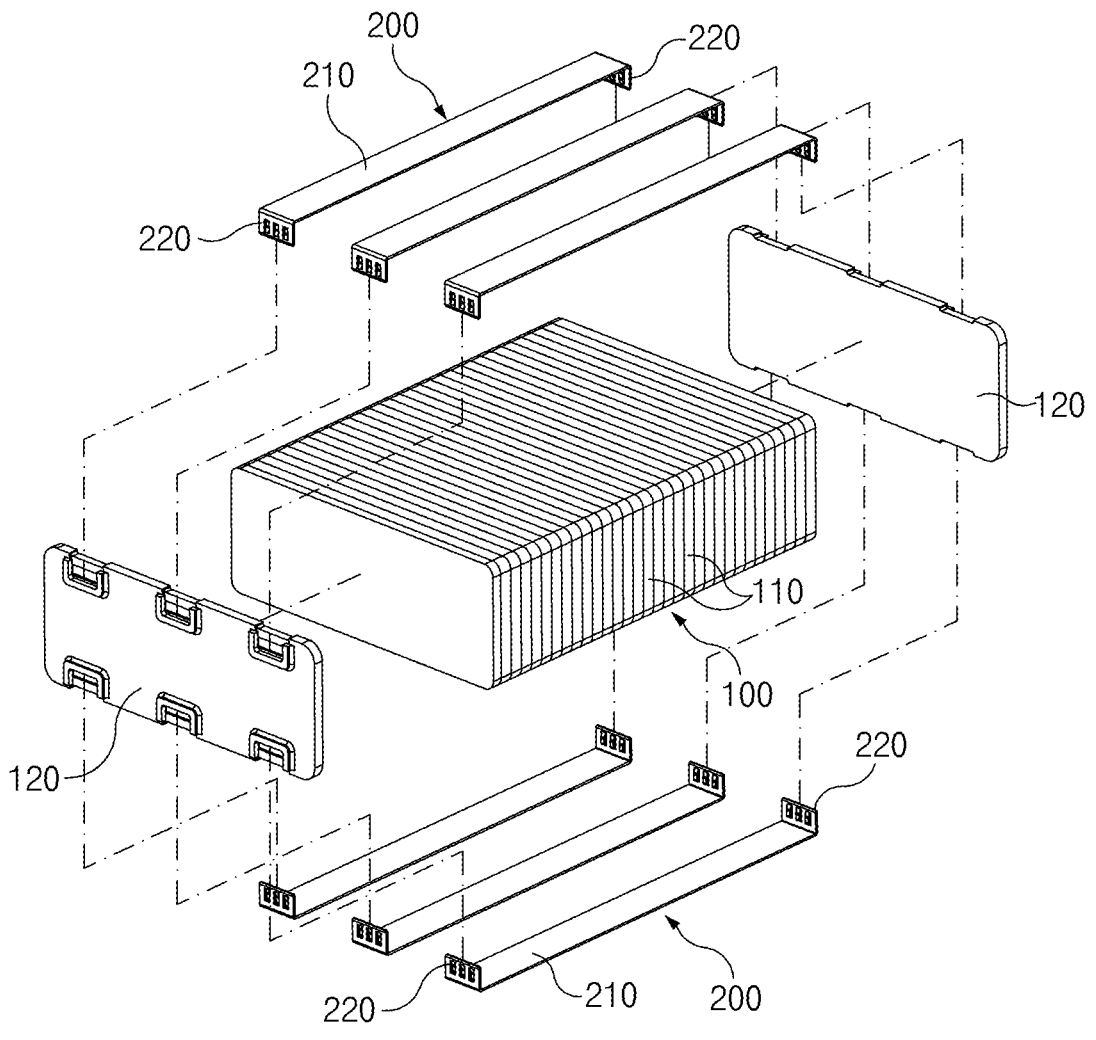
FIG. 2 is a view for explaining a clamp for a fuel cell stack according to the first embodiment of the present disclosure.
Figure 3:
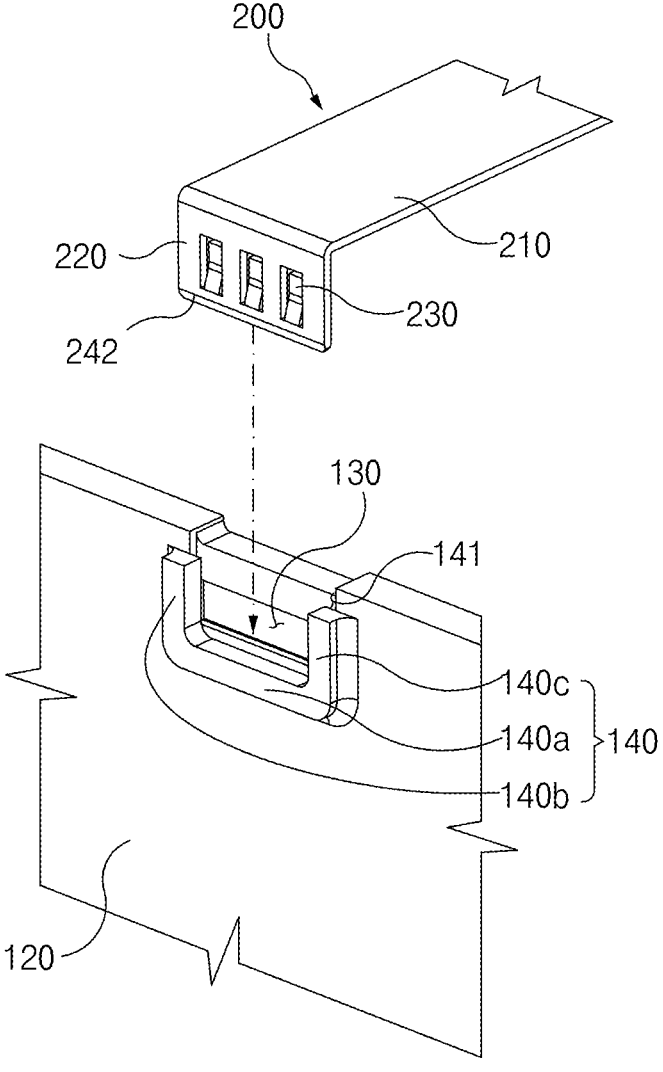
FIG. 3 is a view for explaining an edge restriction part of the fuel cell stack according to the first embodiment of the present disclosure.
Figure 4:
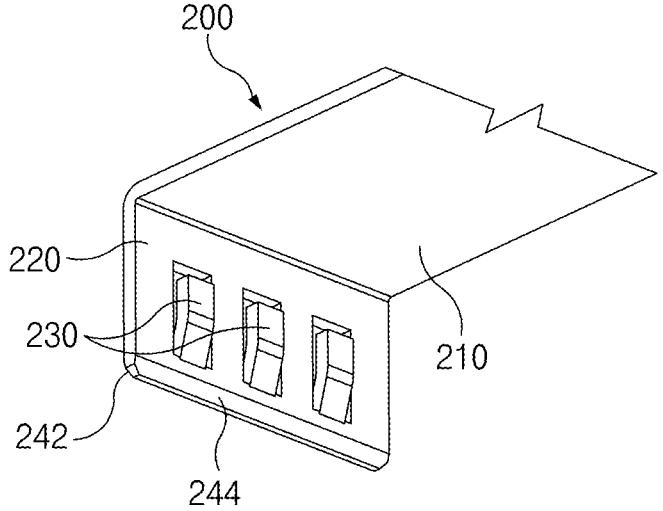
FIG. 4 is a view for explaining a catching protrusion of the fuel cell stack according to the first embodiment of the present disclosure.
Figure 5:
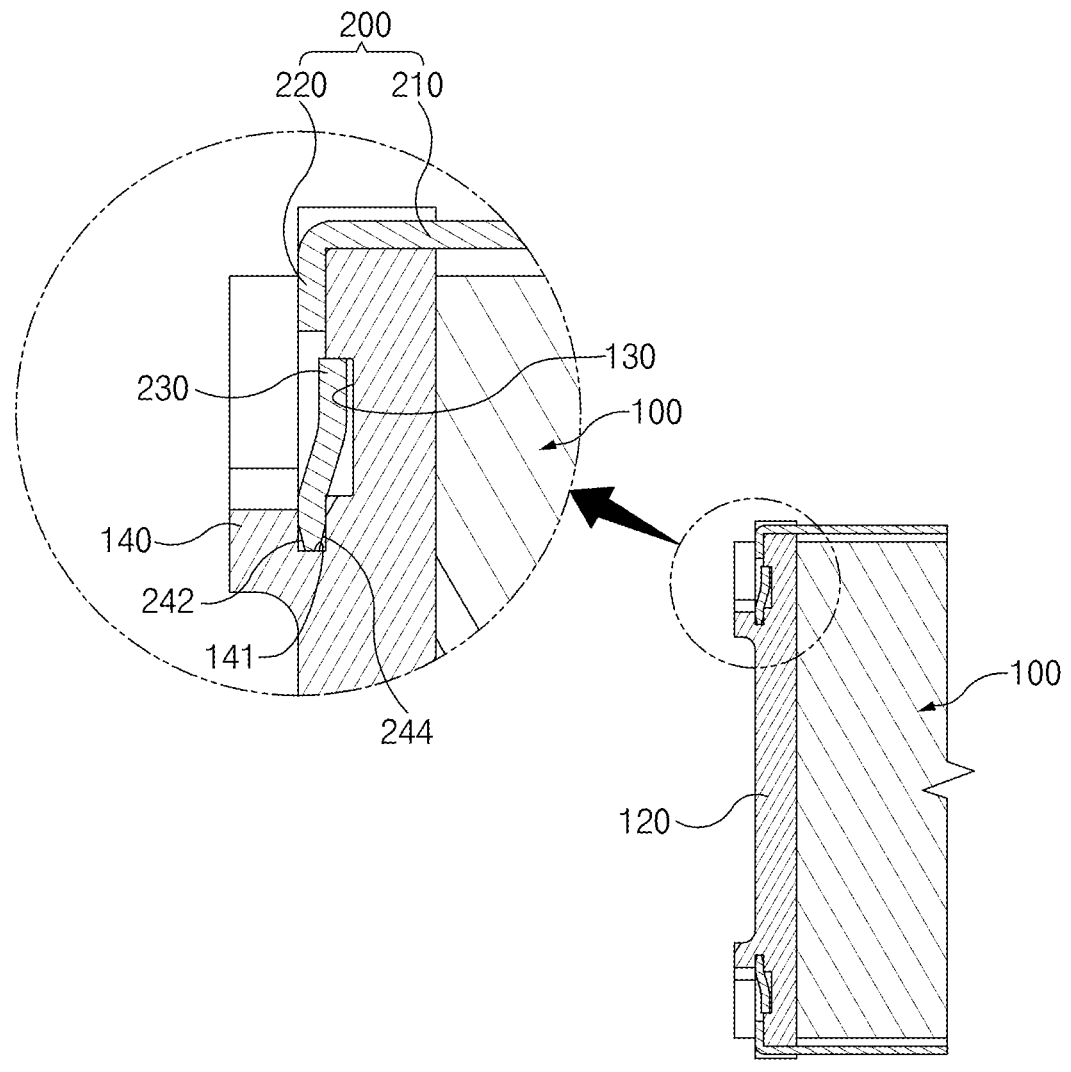
FIGS. 5 and 6 are views for explaining a fastened state of a clamp of the fuel cell stack according to the first embodiment of the present disclosure.
Figure 6:
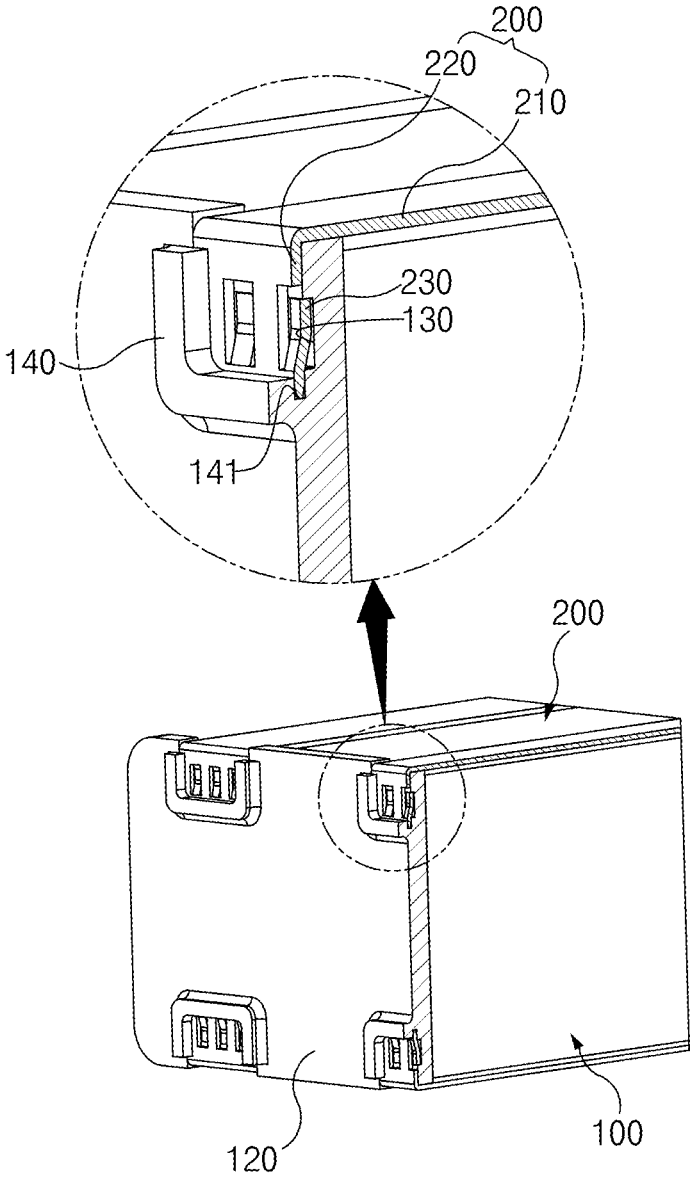
Figure 7:
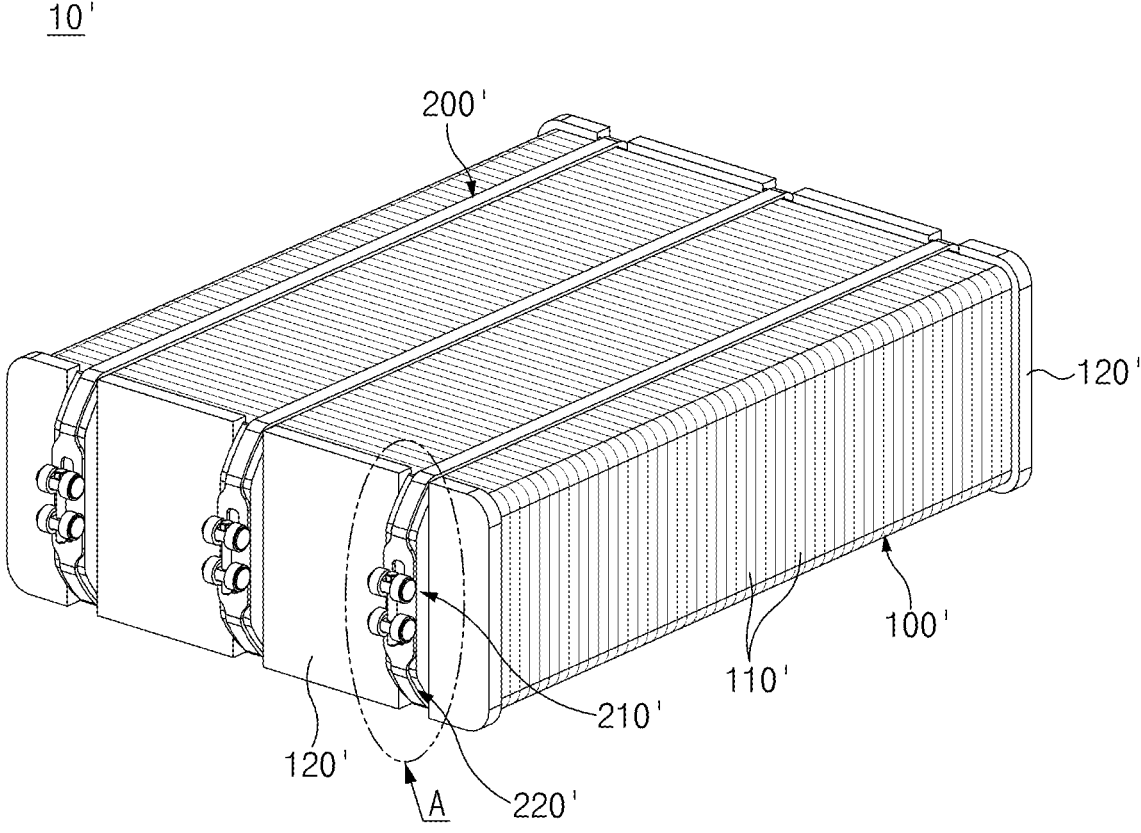
FIG. 7 is a view for explaining a fuel cell stack according to a second embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Referring to FIGS. 1 to 6, a fuel cell stack 10 according to a first embodiment of the present disclosure includes: a reaction part 100 configured by stacking a plurality of unit cells 110; endplates 120 configured to cover ends of the reaction part 100 in a stacking direction of the unit cells 110; and clamps 200 each including a clamp body 210 configured to cover an outer surface of the reaction part 100 in the stacking direction of the unit cells 110, and hook portions 220 connected to ends of the clamp body 210 so as to cover outer surfaces of the endplates 120 and configured to be restricted directly by the endplates 120.

For reference, the fuel cell stack 10 according to the first embodiment of the present disclosure may be applied to various mobility vehicles such as automobiles, ships, and airplanes. The present disclosure is not restricted or limited by the types and properties of subjects (mobility vehicles) to which the fuel cell stack 10 is applied.

The reaction unit 100 refers to a kind of power generation device that generates electrical energy through a chemical reaction of fuel (e.g., hydrogen), and the reaction unit may be configured by stacking several tens or hundreds of unit cells (fuel cells) 110 in series in a reference stacking direction.

The unit cell 110 may have various structures capable of producing electricity by means of an oxidation-reduction reaction between fuel (e.g., hydrogen) and an oxidant (e.g., reaction air). The present disclosure is not restricted or limited by the structure of the unit cell 110.

According to the first exemplary embodiment of the present disclosure, the unit cell 110 may include a membrane electrode assembly (MEA, not illustrated) and separators (not illustrated) stacked on two opposite surfaces of the membrane electrode assembly.

The membrane electrode assembly (MEA) is configured to generate electricity through an oxidation-reduction reaction between fuel (e.g., hydrogen), which is a first reactant gas, and an oxidant (e.g., air) which is a second reactant gas.

The membrane electrode assembly may be variously changed in structure and material in accordance with required conditions and design specifications. The present disclosure is not restricted or limited by the structure and material of the membrane electrode assembly.

For example, the membrane electrode assembly may include an electrolyte membrane through which hydrogen ions move, and catalyst electrode layers attached to two opposite sides of the electrolyte membrane. The electrochemical reactions occur in the catalyst electrode layers. In addition, gas diffusion layers (GDLs) (not illustrated) may be disposed at two opposite sides of the membrane electrode assembly. The gas diffusion layers serve to uniformly distribute the reactant gases and transfer generated electrical energy.

The separator serves not only to block air and hydrogen, which are the reactant gases, but to define flow paths for moving the reactant gases and a coolant and transmit electric current to an external circuit.

In addition, the separators may also serve to distribute heat, which is generated in the unit cell 110, to the entire unit cell 110, and the excessively generated heat may be discharged to the outside by the coolant flowing along the cooling flow paths (not illustrated) between the separators.

The separators are configured to supply the first reactant gas (e.g., hydrogen) and the second reactant gas (e.g., air) to the membrane electrode assembly, and disposed to be in close contact with one surface and the other surface of the membrane electrode assembly in a direction in which the unit cells 110 are stacked.

For example, the separator (e.g., a first separator) disposed on one surface of the membrane electrode assembly may be any one of an anode separator configured to define a flow path for fuel (e.g., hydrogen) which is the first reactant gas and a cathode separator configured to define a flow path for an oxidant (e.g., air) which is the second reactant gas. Further, the separator (e.g., a second separator)

disposed on the other surface of the membrane electrode assembly may be the other of the anode separator and the cathode separator.

For example, the first separator may be in close contact with one surface of the membrane electrode assembly. The first channel (not illustrated) through which the first reactant gas (e.g., hydrogen) flows may be provided in one surface of the first separator that faces the membrane electrode assembly, and a cooling channel (not illustrated) through which the coolant flows may be provided in the other surface of the first separator.

The second separator may be in close contact with the other surface of the membrane electrode assembly. The second channel (not illustrated) through which the second reactant gas (e.g., air) flows may be provided in one surface of the second separator that faces the membrane electrode assembly, and a cooling channel (not illustrated) through which the coolant flows may be provided in the other surface of the second separator.

For reference, hydrogen, which is the fuel, and air, which is the oxidant, may be supplied to an anode (not illustrated) and a cathode (not illustrated) of the membrane electrode assembly, respectively, through the channels (not illustrated) in the first separator and the second separator. The hydrogen may be supplied to the anode, and the air may be supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The endplates 120 serve to protect the reaction part 100 from external impact or the like and define outermost peripheral sides of the fuel cell stack 10.

The endplate 120 may be made of various materials in accordance with required conditions and design specifications. The present disclosure is not restricted or limited by the material of the endplate 120. For example, the endplate 120 may be made of a typical metallic material.

The endplate 120 may have various structures capable of covering an outermost peripheral end (outer surface) of the reaction part 100. The present disclosure is not restricted or limited by the structure and shape of the endplate 120.

For example, the endplate 120 may have a structure corresponding to the unit cell 110. The outer surfaces of the unit cells 110 (the outermost peripheral end of the reaction part) may be entirely covered by the endplates 120.

Referring to FIGS. 3 to 6, the clamp 200 is provided to ensure sealability (fastening pressure) of the fuel cell stack 10. The respective unit cells 110 may be in close contact with one another by preset fastening pressure by the clamp 200.

More specifically, the clamp 200 includes: the clamp body 210 configured to cover the outer surface of the reaction part 100 in the stacking direction of the unit cells 110, and the hook portions 220 connected to the ends of the clamp body 210 so as to cover the outer surfaces of the endplates 120 and configured to be restricted directly by the endplates 120.

The clamp body 210 may have various structures capable of covering the outer surface of the reaction part 100 in the stacking direction of the unit cells 110. The present disclosure is not restricted or limited by the structure and shape of the clamp body 210.

For example, the clamp body 210 may be provided in the form of a straight strap (band) having a length corresponding to the reaction part 100 (a length in a longitudinal direction of the reaction part 100).

According to another example of the first embodiment of the present disclosure, the clamp body may have a curved shape (e.g., an S shape or a C shape) or other shapes.

The clamp 200 may be variously changed in number and mounting position in accordance with required conditions and design specifications. The present disclosure is not restricted or limited by the number of clamps 200 and the mounting position of the clamp 200.

Hereinafter, an example will be described in which a total of six clamps 200 are fastened to the reaction part 100, three clamps 200 for each of upper and lower sides of the reaction part 100.

The hook portions 220 are connected to the ends of the clamp body 210 so that the hook portions 220 are restricted directly by (fastened directly to) the endplates 120 and cover the outer surfaces of the endplate 120.

In this case, the configuration in which the hook portion 220 is restricted directly by the endplate 120 is defined as a configuration in which the hook portion 220 is independently (autonomously) fastened to (bound by) the endplate 120 without using a separate binding member such as a separate fastening bolt.

Hereinafter, an example will be described in which the hook portions 220 are respectively provided at the two opposite ends of the clamp body 210, and the hook portions 220 are fastened to the corresponding endplates 120. For example, the hook portions 220, together with the clamp body 210, may define an approximately "U"-shaped cross-sectional shape.

According to another example of the first embodiment of the present disclosure, the hook portion may be provided only at any one of the two opposite ends of the clamp body.

The hook portion 220 may have various structures capable of being restricted directly by (fastened directly to) the endplate 120. The present disclosure is not restricted or limited by the structure of the hook portion 220.

According to the first exemplary embodiment of the present disclosure, the fuel cell stack 10 may include catching grooves 130 provided in the endplates 120, and catching protrusions 230 provided on an inner surface of the hook portion 220 that faces the endplate 120, the catching protrusions 230 being configured to be accommodated in the catching groove 130. The hook portion 220 may be restricted by the endplate 120 by means of the catching protrusion 230 and the catching groove 130.

The catching groove 130 is recessed in the outer surface of the endplate 120 that faces the hook portion 220, such that the catching protrusion 230 may be accommodated in the catching groove 130.

The catching groove 130 may have various structures and shapes capable of accommodating the catching protrusion 230. The present disclosure is not restricted or limited by the structure and shape of the catching groove 130.

For example, the catching groove 130 may be provided in the form of an approximately quadrangular groove.

The catching protrusion 230 protrudes from the inner surface of the hook portion 220 that faces the endplate 120. As the catching protrusion 230 is accommodated in the catching groove 130, the clamp 200 (the hook portion) and the reaction part 100 may be fastened.

The catching protrusion 230 may have various structures capable of being accommodated in the catching groove 130. The present disclosure is not restricted or limited by the structure and shape of the catching protrusion 230.

According to the first exemplary embodiment of the present disclosure, the catching protrusion 230 may be integrated with the hook portion 220 by partially processing a part of the hook portion 220.

For example, the catching protrusion 230 may be integrated with the hook portion 220 by partially cutting out a part of the hook portion 220 and then bending the cut-out portion.

According to another example of the first embodiment of the present disclosure, the catching protrusion may be provided by machining (e.g., cutting) a part of the hook portion. Alternatively, a catching protrusion may be provided separately from the hook portion and then attached (coupled) to the hook portion.

As described above, according to the first embodiment of the present disclosure, the catching protrusion 230 is integrated with the hook portion 220 by partially processing a part of the hook portion 220. Therefore, it is possible to obtain an advantageous effect of simplifying the process of processing the catching protrusion 230 and reducing the manufacturing costs.

In particular, the catching protrusion 230 may be connected to the hook portion 220 and configured to be elastically movable from a first position at which the catching protrusion 230 is accommodated in the catching groove 130 to a second position at which the catching protrusion 230 is withdrawn out of the catching groove 130.

The catching protrusion 230 may be connected to the hook portion 220 while defining a shape of a cantilevered beam (cantilever). More specifically, one end (a lower end based on FIG. 5) of the catching protrusion 230 may be a fixed end fixed (connected) to the hook portion 220, and the other end (an upper end based on FIG. 5) of the catching protrusion 230 may be disposed as a free end. The free end of the catching protrusion 230 may elastically move (from the first position to the second position) relative to the fixed end.

With the above-mentioned structure, when the clamp 200 is positioned to be in close contact with the reaction part 100, the catching protrusion 230 elastically passes over the outer surface of the endplate 120 and then is accommodated in the catching groove 130 by snap-fit coupling, such that the hook portion 220 and the endplate 120 may be fastened (restricted).

As described above, according to the first embodiment of the present disclosure, the catching protrusion 230 may be elastically movable relative to the hook portion 220, such that the state in which the catching protrusion 230 is accommodated in the catching groove 130 may be elastically supported. Therefore, it is possible to obtain an advantageous effect of inhibiting the withdrawal of the catching protrusion 230 from the catching groove 130 (the withdrawal of the catching protrusion from the catching groove in the upward/downward direction based on FIG. 5) and stably maintaining the arrangement state of the catching protrusion 230 (the state in which the catching protrusion 230 is restricted by the catching groove).

According to the first exemplary embodiment of the present disclosure, the fuel cell stack 10 may include an edge restriction part 140 provided on the outer surface of the endplate 120 and configured to cover an edge of the hook portion 220. An edge accommodation space 141 may be defined between the edge restriction part 140 and the endplate 120 and accommodate the edge of the hook portion 220.

The edge restriction part 140 is provided to more stably maintain the arrangement state of the catching protrusion 230 (the state in which the catching protrusion 230 is restricted by the catching groove).

Among other things, the edge restriction part 140 is provided to inhibit the catching protrusion 230 from being withdrawn to the second position (moving in a direction in which the catching protrusion 230 is withdrawn from the catching groove) in the state in which the catching protrusion 230 is positioned at the first position (the state in which the catching protrusion 230 is accommodated in the catching groove).

The edge restriction part 140 may have various structures capable of covering the edge of the hook portion 220 in the state in which the catching protrusion 230 is accommodated in the catching groove 130. The present disclosure is not restricted or limited by the structure of the edge restriction part 140.

For example, the edge restriction part 140 may include: a distal end restriction portion 140a configured to cover a distal end of the hook portion 220; a first lateral end restriction portion 140b configured to cover a first lateral end (e.g., a left end based on FIG. 3) of the hook portion 220; and a second lateral end restriction portion 140c configured to cover a second lateral end (e.g., a right end based on FIG. 3) of the hook portion 220. The distal end restriction portion 140a, the first lateral end restriction portion 140b, and the second lateral end restriction portion 140c may collectively define the edge accommodation space 141 opened at one end thereof (e.g., opened at an upper end based on FIG. 3).

For example, the distal end restriction portion 140a, the first lateral end restriction portion 140b, and the second lateral end restriction portion 140c may collectively define an approximately "U" shape. The edge accommodation space 141 may also be defined to have an approximately "U" shape.

The hook portion 220 may be introduced between the edge restriction part 140 and the endplate 120 (introduced into the edge accommodation space) through the opening portion of the edge accommodation space 141. When the hook portion 220 is completely introduced, the catching protrusion 230 may be accommodated in the catching groove 130.

As described above, according to the first embodiment of the present disclosure, the edge of the hook portion 220 is covered by the edge restriction part 140 in the state in which the catching protrusion 230 is accommodated in the catching groove 130. Therefore, it is possible to obtain an advantageous effect of inhibiting the withdrawal of the catching protrusion 230 to the second position (the movement in the direction in which the catching protrusion 230 is withdrawn from the catching groove) in the state in which the catching protrusion 230 is positioned at the first position (the state in which the catching protrusion 230 is accommodated in the catching groove). Further, it is possible to obtain an advantageous effect of more stably maintaining the state in which the clamp 200 is fastened to the reaction part 100.

Meanwhile, in the first embodiment of the present disclosure illustrated and described above, the example has been described in which the edge restriction part 140 includes all the distal end restriction portion 140a, the first lateral end restriction portion 140b, and the second lateral end restriction portion 140c. However, according to another example of the first embodiment of the present disclosure, the edge restriction part may include only some of the distal end restriction portion, the first lateral end restriction portion, and the second lateral end restriction portion (e.g., the edge restriction part includes any one or two of the distal end restriction portion, the first lateral end restriction portion, and the second lateral end restriction portion).

According to the first exemplary embodiment of the present disclosure, the fuel cell stack 10 may include a first inclined guide portion 242 provided on an outer surface of the distal end of the hook portion 220 and configured to guide the hook portion 220 to the edge accommodation space 141.

The first inclined guide portion 242 may be variously changed in length and inclination angle in accordance with required conditions and design specifications. The present disclosure is not restricted or limited by the length and inclination angle of the first inclined guide portion 242.

As described above, according to the first embodiment of the present disclosure, the first inclined guide portion 242 is provided on the outer surface of the distal end of the hook portion 220. When the hook portion 220 enters the edge accommodation space 141, an inner edge portion of the distal end restriction portion 140a comes into contact with the first inclined guide portion 242, and the hook portion 220 is guided to the edge accommodation space 141 (the hook portion and the edge accommodation space are aligned). Therefore, the hook portion 220 may be accurately guided to the edge accommodation space 141 even though the hook portion 220 and the edge accommodation space 141 are misaligned. Therefore, it is possible to obtain an advantageous effect of improving the convenience in assembling the hook portion 220 and preventing the hook portion 220 from being erroneously assembled.

In addition, according to the first exemplary embodiment of the present disclosure, the fuel cell stack 10 may include a second inclined guide portion 244 provided on an inner surface of the distal end of the hook portion 220 and configured to guide the hook portion 220 to the edge accommodation space 141.

The second inclined guide portion 244 may be variously changed in length and inclination angle in accordance with required conditions and design specifications. The present disclosure is not restricted or limited by the length and inclination angle of the second inclined guide portion 244.

As described above, according to the first embodiment of the present disclosure, the second inclined guide portion 244 is provided on the inner surface of the distal end of the hook portion 220. When the hook portion 220 enters the edge accommodation space 141, an edge portion of the catching groove 130 comes into contact with the second inclined guide portion 244, and the hook portion 220 is guided to the edge accommodation space 141 (the hook portion and the edge accommodation space are aligned). Therefore, the hook portion 220 may be accurately guided to the edge accommodation space 141 even though the hook portion 220 and the edge accommodation space 141 are misaligned. Therefore, it is possible to obtain an advantageous effect of improving the convenience in assembling the hook portion 220 and preventing the hook portion 220 from being erroneously assembled.

According to the present disclosure as described above, it is possible to obtain an advantageous effect of simplifying the structure and the manufacturing process.

In particular, according to the present disclosure, it is possible to obtain an advantageous effect of stably maintaining (fixing) the arrangement state of the fastening member without using a separate fastening bolt.

In addition, according to the present disclosure, it is possible to obtain an advantageous effect of contributing to the reductions in size and weight of the fuel cell stack and reducing the costs.

In addition, according to the present disclosure, it is possible to make it easy to handle (e.g., dismantle or disassemble) the fuel cell stack and simplify the processes (maintenance processes) of inspecting and replacing the fuel cell stack. Therefore, it is possible to obtain an advantageous effect of reducing the time and cost required for the processes.

Referring to FIGS. 7 to 12, a fuel cell stack 10' according to a second embodiment of the present disclosure includes: a reaction part 100' configured by stacking a plurality of unit cells 110'; endplates 120' configured to cover ends of the reaction part 100' in a stacking direction of the unit cells 110'; and a clamp devices 200' including a clamp seating part 210' and a clamp member 220'.

For reference, the fuel cell stack 10' according to second first embodiment of the present disclosure may be applied to various mobility vehicles such as automobiles, ships, and airplanes. The present disclosure is not restricted or limited by the types and properties of subjects (mobility vehicles) to which the fuel cell stack 10' is applied.

The reaction unit 100' refers to a kind of power generation device that generates electrical energy through a chemical reaction of fuel (e.g., hydrogen), and the reaction unit may be configured by stacking several tens or hundreds of unit cells (fuel cells) 110' in series in a reference stacking direction.

The unit cell 110' may have various structures capable of producing electricity by means of an oxidation-reduction reaction between fuel (e.g., hydrogen) and an oxidant (e.g., reaction air). The present disclosure is not restricted or limited by the structure of the unit cell 110'.

According to the second exemplary embodiment of the present disclosure, the unit cell 110' may include a membrane electrode assembly (MEA, not illustrated) and separators (not illustrated) stacked on two opposite surfaces of the membrane electrode assembly.

The membrane electrode assembly (MEA) is configured to generate electricity through an oxidation-reduction reaction between fuel (e.g., hydrogen), which is a first reactant gas, and an oxidant (e.g., air) which is a second reactant gas.

The membrane electrode assembly may be variously changed in structure and material in accordance with required conditions and design specifications. The present disclosure is not restricted or limited by the structure and material of the membrane electrode assembly.

For example, the membrane electrode assembly may include an electrolyte membrane through which hydrogen ions move, and catalyst electrode layers attached to two opposite sides of the electrolyte membrane. The electrochemical reactions occur in the catalyst electrode layers. In addition, gas diffusion layers (GDLs) (not illustrated) may be disposed at two opposite sides of the membrane electrode assembly. The gas diffusion layers serve to uniformly distribute the reactant gases and transfer generated electrical energy.

The separator serves not only to block air and hydrogen, which are the reactant gases, but to define flow paths for moving the reactant gases and a coolant and transmit electric current to an external circuit.

In addition, the separators may also serve to distribute heat, which is generated in the unit cell 110', to the entire unit cell 110', and the excessively generated heat may be discharged to the outside by the coolant flowing along the cooling flow paths (not illustrated) between the separators.

The separators are configured to supply the first reactant gas (e.g., hydrogen) and the second reactant gas (e.g., air) to the membrane electrode assembly, and disposed to be in close contact with one surface and the other surface of the membrane electrode assembly in a direction in which the unit cells 110' are stacked.

For example, the separator (e.g., a first separator) disposed on one surface of the membrane electrode assembly may be any one of an anode separator configured to define a flow path for fuel (e.g., hydrogen) which is the first reactant gas and a cathode separator configured to define a flow path for an oxidant (e.g., air) which is the second reactant gas. Further, the separator (e.g., a second separator) disposed on the other surface of the membrane electrode assembly may be the other of the anode separator and the cathode separator.

For example, the first separator may be in close contact with one surface of the membrane electrode assembly. The first channel (not illustrated) through which the first reactant gas (e.g., hydrogen) flows may be provided in one surface of the first separator that faces the membrane electrode assembly, and a cooling channel (not illustrated) through which the coolant flows may be provided in the other surface of the first separator.

The second separator may be in close contact with the other surface of the membrane electrode assembly. The second channel (not illustrated) through which the second reactant gas (e.g., air) flows may be provided in one surface of the second separator that faces the membrane electrode assembly, and a cooling channel (not illustrated) through which the coolant flows may be provided in the other surface of the second separator.

For reference, hydrogen, which is the fuel, and air, which is the oxidant, may be supplied to an anode (not illustrated) and a cathode (not illustrated) of the membrane electrode assembly, respectively, through the channels (not illustrated) in the first separator and the second separator. The hydrogen may be supplied to the anode, and the air may be supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons transmitted through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

The endplates 120' serve to protect the reaction part 100' from external impact or the like and define outermost peripheral sides of the fuel cell stack 10'.

The endplate 120' may be made of various materials in accordance with required conditions and design specifications. The present disclosure is not restricted or limited by the material of the endplate 120'. For example, the endplate 120' may be made of a typical metallic material.

The endplate 120' may have various structures capable of covering an outermost peripheral end (outer surface) of the reaction part 100'. The present disclosure is not restricted or limited by the structure and shape of the endplate 120'.

For example, the endplate 120' may have a structure corresponding to the unit cell 110'. The outer surfaces of the unit cells 110' (the outermost peripheral end of the reaction part) may be entirely covered by the endplates 120'.

Referring to FIGS. 9 to 12, the clamp device 200' is provided to ensure sealability (fastening pressure) of the fuel cell stack 10'. The respective unit cells 110' may be in close contact with one another by preset fastening pressure by the clamp device 200'.

More specifically, the clamp device 200' includes: a clamp seating part 210' including a flat seating part 212' provided on the outer surface of the endplate 120', a first curved seating part 214' provided at one end of the flat seating part 212', and a second curved seating part 216' provided at the other end of the flat seating part 212'; and a clamp member 220' seated on the clamp seating part 210' and configured to surround the reaction part 100'.

Figure 8:
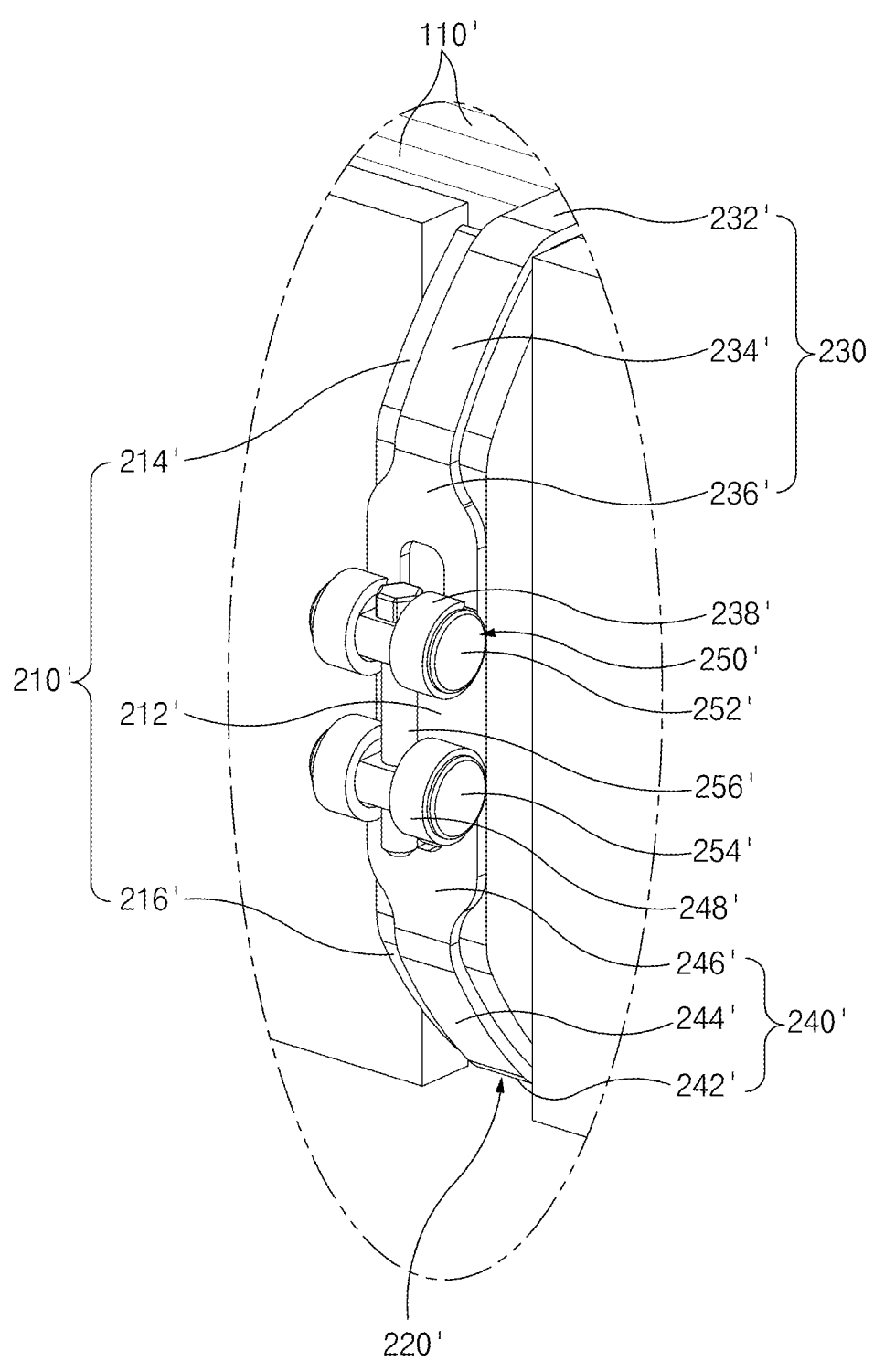
FIG. 8 is an enlarged view of part 'A' in FIG. 7.
Figure 9:
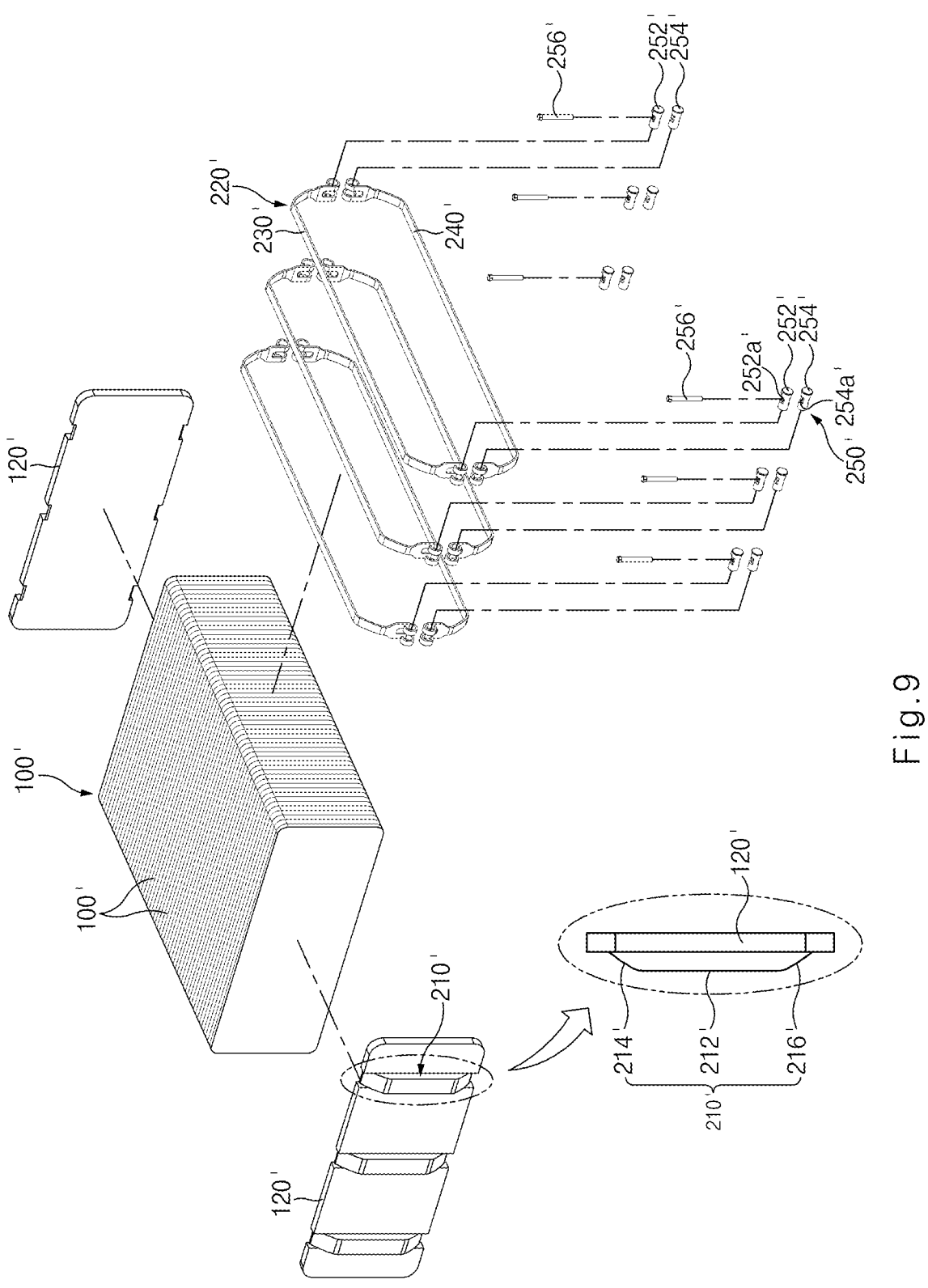
FIG. 9 is a view for explaining a clamp device for a fuel cell stack according to the second embodiment of the present disclosure.
Figure 10:
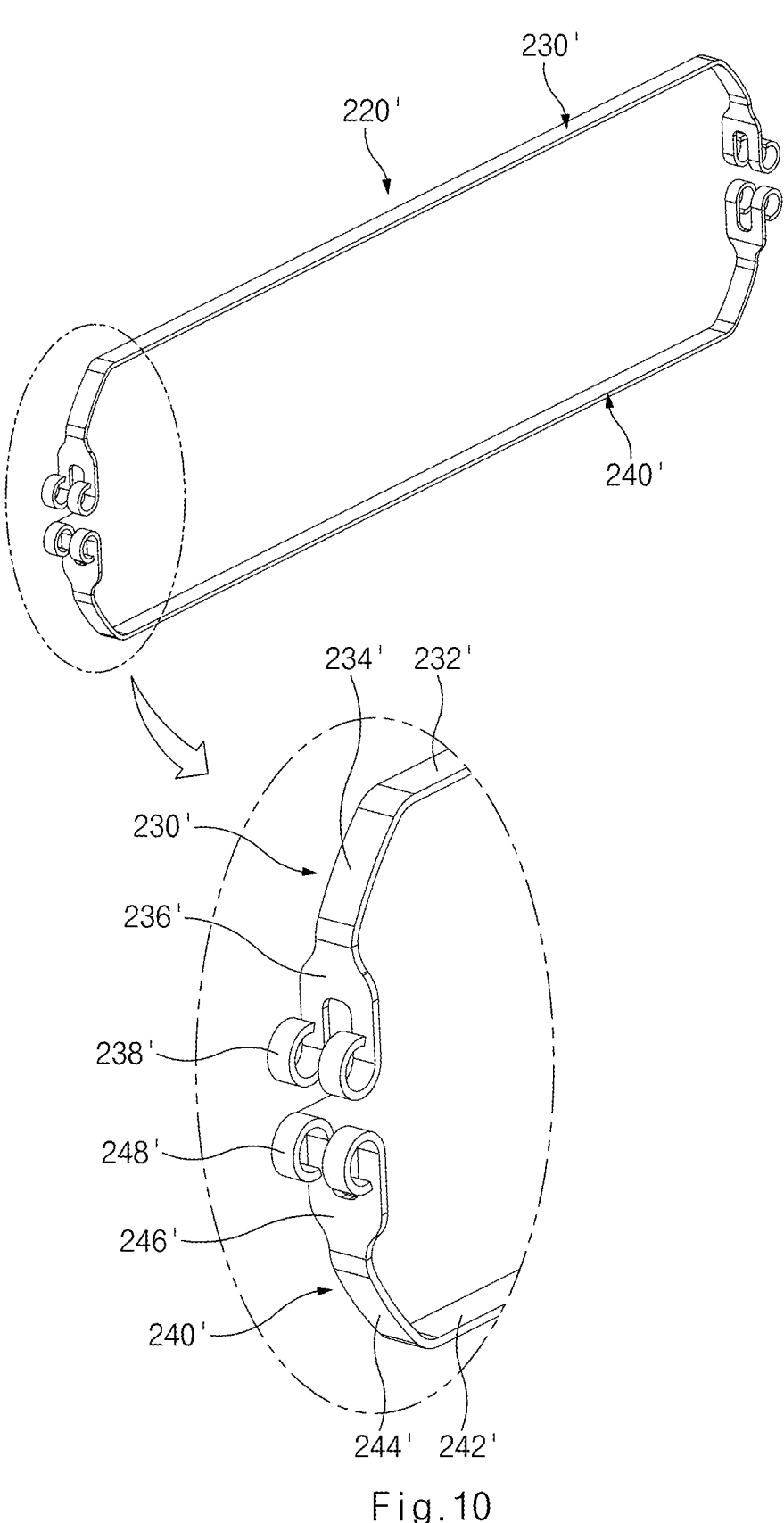
FIG. 10 is a view for explaining a first clamp and a second clamp of the fuel cell stack according to the second embodiment of the present disclosure.

Referring to FIGS. 8 and 9, the clamp seating part 210' is provided on the outer surface of the endplate 120' to disperse the fastening force applied to the endplate 120' (the fastening force applied to fix the clamp member to the endplate).

In this case, the configuration in which the fastening force applied to the endplate 120' is dispersed is defined as a configuration in which the fastening force applied to the endplate 120' is distributed and applied to several sites without being concentrated on the particular site.

More specifically, the clamp seating part 210' includes; the flat seating part 212' provided on the outer surface of the endplate 120'; the first curved seating part 214' provided at one end (e.g., the upper end based on FIG. 9) of the flat seating part 212'; and the second curved seating part 216' provided at the other end (e.g., the lower end based on FIG. 9) of the flat seating part 212'.

The first curved seating part 214' and the second curved seating part 216' may have various structures having a seating surface that is a curved surface. The present disclosure is not restricted or limited by the structures and shapes of the first curved seating part 214' and the second curved seating part 216'.

For example, the first curved seating part 214' and the second curved seating part 216' may each have an arc (rounded) shape having a predetermined curvature.

According to another example of the second embodiment of the present disclosure, the first curved seating part and the second curved seating part may each have a wave shape or other curved shapes.

According to the second exemplary embodiment of the present disclosure, the clamp seating part 210' may be integrated with the outer surface of the endplate 120'.

For example, the clamp seating part 210' may be integrated with the outer surface of the endplate 120' by partially processing (e.g., machining) the outer surface of the endplate 120'.

According to another example of the second embodiment of the present disclosure, the clamp seating part may be provided when the endplate is manufactured by injection molding. The clamp seating part may be provided separately from the endplate and then attached or coupled to the endplate.

The clamp member 220' surrounds the reaction part 100' and is seated on the clamp seating part 210'.

The clamp member 220' may have various structures capable of being seated on the clamp seating part 210' and surrounding the reaction part 100'. The present disclosure is not restricted or limited by the structure and shape of the clamp member 220'.

For example, the clamp member 220' may include: a first clamp 230' seated on the clamp seating part 210' and configured to surround one part of the periphery of the reaction part 100' (e.g., the upper portion of the reaction part); a second clamp 240' seated on the clamp seating part 210' and configured to surround the other part of the periphery of the reaction part 100' (e.g., the lower portion of the reaction part); and a fastening part 250' configured to apply a fastening force to the first clamp 230' and the second clamp 240' so that the first clamp 230' and the second clamp 240' are in close contact with the clamp seating part 210'.

Hereinafter, an example will be described in which the first clamp 230' and the second clamp 240' have shapes and sizes corresponding to one another. According to another example of the second embodiment of the present disclosure, the first clamp and the second clamp may have different shapes or sizes.

The clamp member 220' may be variously changed in number and mounting position in accordance with required conditions and design specifications. The present disclosure is not restricted or limited by the number of clamp members 220' and the mounting position of the clamp member 200'.

Hereinafter, an example will be described in which the fuel cell stack 10' includes a total of three clamp members 220' spaced apart from one another. Alternatively, the fuel cell stack may include two or fewer clamp members or include four or more clamp members.

The first clamp 230' may have various structures capable of partially surrounding one part of the periphery of the reaction part 100'. The present disclosure is not restricted or limited by the structure and shape of the first clamp 230'.

According to the second exemplary embodiment of the present disclosure, the first clamp 230' may include: a first clamp body 232' configured to cover the outer surface of the reaction part 100' in the stacking direction of the unit cells 110; first curved clamp portions 234' connected to the first clamp body 232' and each having a curvature corresponding to the first curved seating part 214', the first curved clamp portions 234' being configured to be seated on the first curved seating parts 214'; and first flat clamp portions 236' connected to the first curved clamp portions 234' and seated on the flat seating parts 212'.

The first clamp body 232' may be provided in the form of a straight strap (band) having a length corresponding to the reaction part 100' (a length in a longitudinal direction of the reaction part 100').

The first curved clamp portions 234' may be respectively connected to two opposite ends of the first clamp body 232' so as to have a curvature corresponding to the first curved seating part 214' (e.g., have an approximately circular arc shape that may be in surface contact with the first curved seating part). The first flat clamp portion 236' may be connected to the end of the first curved clamp portion 234' so as to have a straight shape that may be in close contact with the flat seating part 212'.

Hereinafter, an example will be described in which the first clamp body 232', the first curved clamp portions 234', and the first flat clamp portions 236' are connected to collectively define an approximately "U" shape. For example, the first clamp body 232', the first curved clamp portions 234', and the first flat clamp portions 236' may be integrated by continuously bending a single one member (e.g., a metallic band-shaped material). Alternatively, the first clamp body 232', the first curved clamp portions 234', and the first flat clamp portions 236' may be independently provided and then separately connected (fastened).

The second clamp 240' may have various structures capable of partially surrounding one part of the periphery of the reaction part 100'. The present disclosure is not restricted or limited by the structure and shape of the second clamp 240'.

According to the second exemplary embodiment of the present disclosure, the second clamp 240' may include: a second clamp body 242' configured to cover the outer surface of the reaction part 100' in the stacking direction of the unit cells 110'; second curved clamp portions 244' connected to the second clamp body 242' and each having a curvature corresponding to the second curved seating part 216', the second curved clamp portions 244' being configured to be seated on the second curved seating parts 216'; and second flat clamp portions 246' connected to the second curved clamp portions 244' and seated on the flat seating parts 212'.

The second clamp body 242' may be provided in the form of a straight strap (band) having a length corresponding to the reaction part 100' (a length in a longitudinal direction of the reaction part 100').

The second curved clamp portions 244' may be respectively connected to two opposite ends of the second clamp body 242' so as to have a curvature corresponding to the second curved seating part 216' (e.g., have an approximately circular arc shape that may be in surface contact with the second curved seating part). The second flat clamp portion 246' may be connected to the end of the second curved clamp portion 244' so as to have a straight shape that may be in close contact with the flat seating part 212'.

Hereinafter, an example will be described in which the second clamp body 242', the second curved clamp portions 244', and the second flat clamp portions 246' are connected to collectively define an approximately "U" shape. For example, the second clamp body 242', the second curved clamp portions 244', and the second flat clamp portions 246' may be integrated by continuously bending a single one member (e.g., a metallic band-shaped material). Alternatively, the second clamp body, the second curved clamp portions, and the second flat clamp portions may be independently provided and then separately connected (fastened).

The fastening part 250' is configured to apply the fastening force to the first clamp 230' and the second clamp 240' so that the first clamp 230' and the second clamp 240' are in close contact with the clamp seating part 210'.

The fastening part 250' may have various structures capable of fastening the first clamp 230' and the second clamp 240'. The present disclosure is not restricted or limited by the structure and shape of the fastening part 250'.

For example, the fastening part 250' may include: a first fastening member 252' provided on the first clamp 230' and having a first bolt hole 252a'; a second fastening member 254' provided on the second clamp 240' and having a second bolt hole 254a'; and a fastening bolt 256' configured to be fastened to the first bolt hole 252a' and the second bolt hole 254a' so that the first fastening member 252' and the second fastening member 254' are fastened to each other.

The first fastening member 252' may have various structures having the first bolt hole 252a'. The present disclosure is not restricted or limited by the structure and shape of the first fastening member 252'.

For example, the first fastening member 252' may have an approximately cylindrical shape having a circular cross-section. The first bolt hole 252a', which may be screw-fastened, may be provided through an approximately central portion of the first fastening member 252'.

The second fastening member 254' may have various structures having the second bolt hole 254a'. The present disclosure is not restricted or limited by the structure and shape of the second fastening member 254'.

For example, the second fastening member 254' may have an approximately cylindrical shape having a circular cross-section. The second bolt hole 254a', which may be screw-fastened, may be provided through an approximately central portion of the second fastening member 254'.

The fastening bolt 256' is fastened (screw-fastened) to the first bolt hole 252a' and the second bolt hole 254a' so that the first fastening member 252' and the second fastening member 254' are fastened to each other. The fastening pressure applied to the clamp member 220' may be selectively adjusted by rotating the fastening bolt 256'.

For example, when the fastening bolt 256' rotates clockwise in the state in which the fastening bolt 256' is fastened to the first bolt hole 252a' and the second bolt hole 254a', the first fastening member 252' and the second fastening member 254' move toward each other, such that the fastening pressure applied to the clamp member 220' may increase.

On the contrary, when the fastening bolt 256' rotates counterclockwise in the state in which the fastening bolt 256' is fastened to the first bolt hole 252a' and the second bolt hole 254a', the first fastening member 252' and the second fastening member 254' move away from each other, such that the fastening pressure applied to the clamp member 220' may decrease.

The first fastening member 252' and the second fastening member 254' may be connected to the first clamp 230' and the second clamp 240' in various ways in accordance with required conditions and design specifications.

For example, the fuel cell stack 10' may include a first accommodation portion 238' provided at an end of the first clamp 230' and configured to accommodate the first fastening member 252', and a second accommodation portion 248' provided at an end of the second clamp 240' and configured to accommodate the second fastening member 254'.

According to the second exemplary embodiment of the present disclosure, the first accommodation portion 238' may be integrated with the first clamp 230' by partially processing a part of the first clamp 230'. The second accommodation portion 248' may be integrated with the second clamp 240' by partially processing a part of the second clamp 240'.

For example, the first accommodation portion 238' may be provided by bending a part of the end of the first clamp 230' roundly to an approximately circular ring shape, and the second accommodation portion 248' may be provided by bending a part of the end of the second clamp 240' roundly to an approximately circular ring shape.

According to another example of the second embodiment of the present disclosure, the first fastening member and the second fastening member may be connected to the first clamp and the second clamp by welding or other methods.

As described above, according to the second embodiment of the present disclosure, the fastening force applied by the fastening member to fix the clamp member 220' to the endplate 120' is dispersed by the clamp seating part 210' and applied indirectly to the endplate 120' without being concentratedly applied to a particular site of the endplate 120'. Therefore, it is possible to obtain an advantageous effect of minimizing deformation of and damage to the fuel cell disposed adjacent to the endplate 120' caused by the fastening force of the fastening member, and improving the safety and reliability.

Among other things, according to the second embodiment of the present disclosure, a fastening load (fastening force) applied to the clamp member 220' by the fastening bolt 256' is dispersed in a normal direction with respect to the first curved clamp portion 234' seated on the first curved seating part 214' and the second curved clamp portion 244' seated on the second curved seating part 216' (e.g., the fastening load is dispersed in a normal direction with respect to the outer surface of the first curved clamp portion). Therefore, it is possible to obtain an advantageous effect of inhibiting the fastening load from being concentrated on a particular site of the endplate 120'. Further, it is possible to obtain an advantageous effect of minimizing deformation of and damage to the fuel cell caused by the fastening load applied to the endplate 120'.

Moreover, according to the second embodiment of the present disclosure, the fastening bolt 256' need not be fastened directly to the endplate 120' (the bolt hole for fastening the fastening bolt need not be provided). Therefore, it is possible to obtain an advantageous effect of simplifying the structure of the endplate 120' and the process of manufacturing the endplate 120' and improving the structural rigidity of the endplate 120'.

Figure 11:
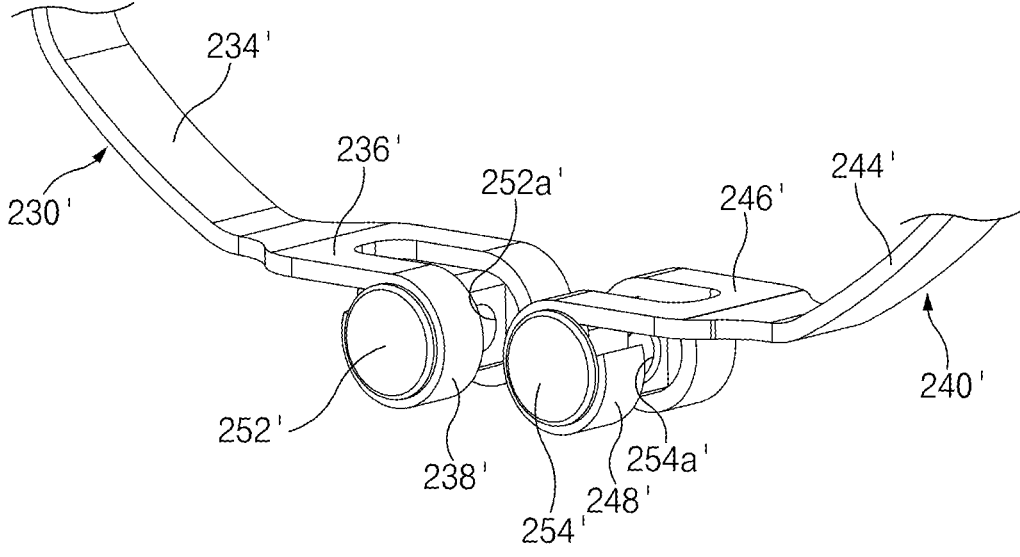
FIG. 11 is a view for explaining a first fastening member and a second fastening member of the fuel cell stack according to the second embodiment of the present disclosure.
Figure 12:
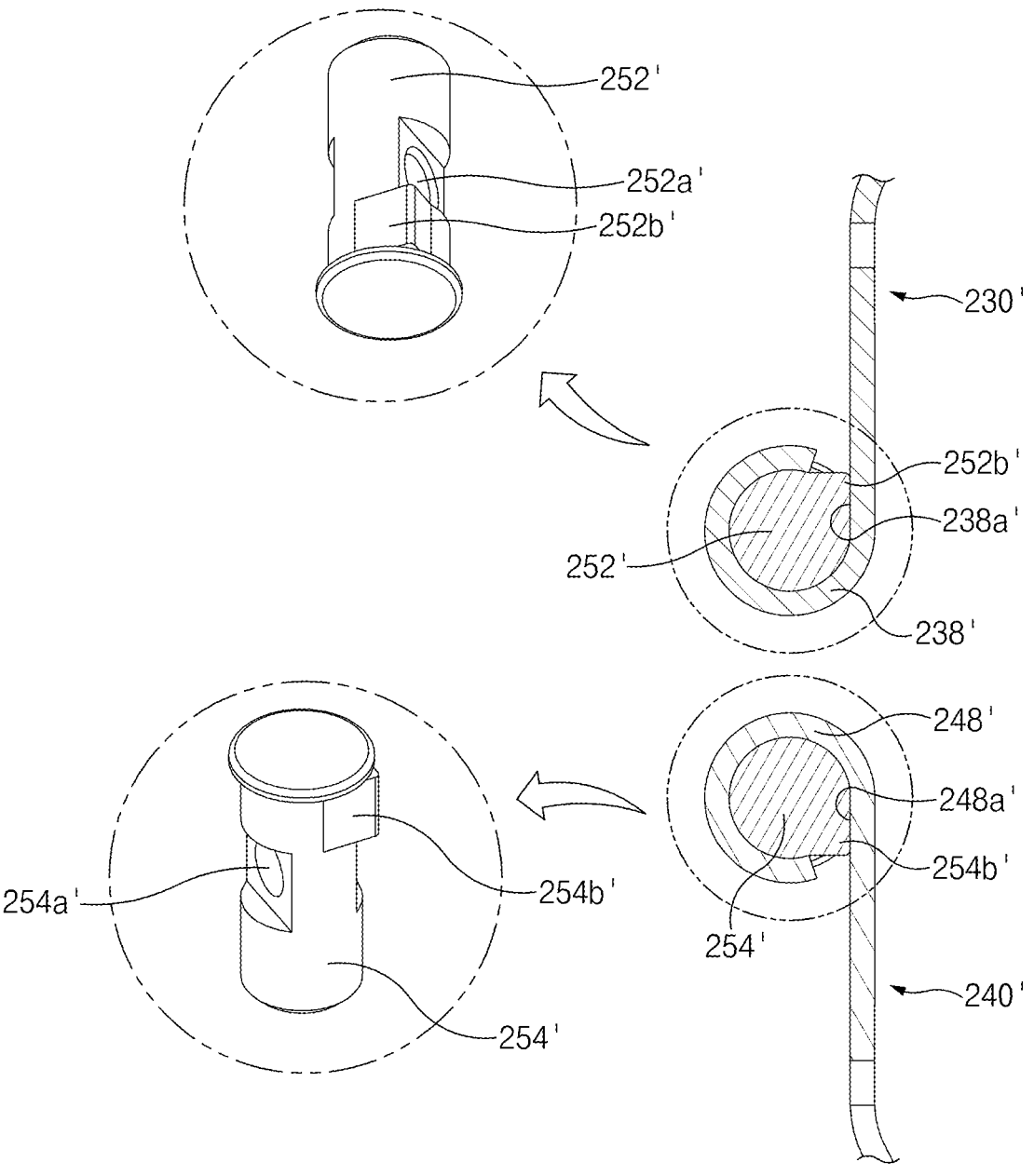
FIG. 12 is a view for explaining a stopper part and a stopper protrusion of the fuel cell stack according to the second embodiment of the present disclosure.

Meanwhile, referring to FIGS. 11 and 12, according to the second exemplary embodiment of the present disclosure, the fuel cell stack 10' may include: a first stopper part 238a' provided on an inner surface of the first accommodation portion 238'; a first stopper protrusion 252b' provided on the first fastening member 252' and configured to come into surface contact with the first stopper part 238a'; a second stopper part 248a' provided on an inner surface of the second accommodation portion 248'; and a second stopper protrusion 254b' provided on the second fastening member 254' and configured to come into surface contact with the second stopper part 248a'.

The first stopper part 238a' and first stopper protrusion 252b' are provided to restrict the rotation of the first fastening member 252' relative to the first accommodation portion 238' while allowing the first bolt hole 252a' to be aligned with a reference position (e.g., disposed in the longitudinal direction of the flat seating part) in the state in which the first fastening member 252' is accommodated in the first accommodation portion 238'.

Likewise, the second stopper part 248a' and the second stopper protrusion 254b' are provided to restrict the rotation of the second fastening member 254' relative to the second accommodation portion 248' while allowing the second bolt hole 254a' to be aligned with a reference position (e.g., disposed in the longitudinal direction of the flat seating part) in the state in which the second fastening member 254' is accommodated in the second accommodation portion 248'.

For reference, as illustrated in FIG. 11, in the state in which the first bolt hole 252a' and the second bolt hole 254a' are respectively aligned with the reference positions, the first bolt hole 252a' and the second bolt hole 254a' may be disposed in a row (coaxially), and the fastening bolt 256' may be fastened to the first bolt hole 252a' and the second bolt hole 254a'. In contrast, in the state in which the first bolt hole 252a' and the second bolt hole 254a' are misaligned, the fastening bolt 256' may not be fastened to or pass through the first bolt hole 252a' and the second bolt hole 254a'.

The stopper parts (the first stopper part and the second stopper part) and the stopper protrusions (the first stopper protrusion and the second stopper protrusion) may have various structures in accordance with required conditions and design specifications.

For example, the first stopper part 238a' may be defined on the inner surface of the first accommodation portion 238' so as to have an approximately flat shape. The first stopper protrusion 252b' may protrude from the peripheral surface of the first fastening member 252' so as to come into surface contact with the first stopper part 238a'.

The second stopper part 248a' may be defined on the inner surface of the second accommodation portion 248' so as to have an approximately flat shape. The second stopper protrusion 254b' may protrude from the peripheral surface of the second fastening member 254' so as to come into surface contact with the second stopper part 248a'.

In the second embodiment of the present disclosure illustrated and described above, the example has been described in which the first stopper part 238a' and the second stopper part 248a' each have a flat shape. However, according to another example of the second embodiment of the present disclosure, the first stopper part and the second stopper part may each have a curved shape or other shapes.

As described above, according to the second embodiment of the present disclosure, the first bolt hole 252a' and the second bolt hole 254a' are coaxially aligned by means of the stopper parts (the first stopper part and the second stopper part) and the stopper protrusions (the first stopper protrusion and the second stopper protrusion). Therefore, it is possible to obtain an advantageous effect of improving the assembling properties of the fastening bolt 256' and simplifying the assembling process.

As described above, according to the second embodiment of the present disclosure, it is possible to obtain an advantageous effect of minimizing deformation of and damage to the fuel cell stack and improving the safety and reliability.

In particular, according to the second embodiment of the present disclosure, the fastening pressure applied to the fuel cell stack by the clamp device may be dispersed without being concentrated on a particular site. Therefore, it is possible to obtain an advantageous effect of minimizing deformation of and damage to the fuel cell stack caused by the concentration of the fastening pressure.

Among other things, according to the second embodiment of the present disclosure, the fastening force applied by the fastening member to fix the clamp member to the endplate may be dispersed and indirectly applied to the endplate without being concentratedly applied to a particular site of the endplate.

The present disclosure has been made in an effort to solve problems in the related art where two opposite ends of the fastening member need to be fastened to the endplates by using separate fastening bolts to fix an arrangement state of the fastening member. For this reason, there are problems in that the manufacturing process is complicated, the productivity and production efficiency deteriorate, and costs are increased.

Therefore, recently, various studies have been conducted to simplify the structure of the fuel cell stack and the process of manufacturing the fuel cell stack, but the study results are still insufficient. Accordingly, there is a need to develop a technology to simplify the structure of the fuel cell stack and the process of manufacturing the fuel cell stack.

In contrast, according to the one embodiment, the hook portion of the clamp is fastened directly to the endplate. Therefore, the fastening structure of the fastening member may be simplified, and the clamp may be fastened to the endplate without using a separate fastening tool (e.g., a spanner).

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FP-GAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fuel cell stack, comprising:
a reaction part configured by stacking a plurality of unit cells;
a plurality of endplates configured to cover ends of the reaction part in a stacking direction of the plurality of unit cells; and a clamp comprising:
a clamp body configured to cover an outer surface of the reaction part in the stacking direction of the plurality of unit cells; and
a plurality of hook portions connected to ends of the clamp body so as to cover outer surfaces of the plurality of endplates and be bound by the plurality of endplates,
wherein each endplate of the plurality of endplates includes a plurality of catching grooves defined therein,
wherein each hook portion of the plurality of hook portions comprises a plurality of catching protrusions provided on an inner surface of the plurality of hook portions facing the plurality of endplates and configured to elastically protrude inwardly facing to the plurality of catching grooves, wherein the plurality of catching protrusions is configured to be accommodated in the plurality of catching grooves, and
wherein each hook portion of the plurality of hook portions is bound by the plurality of endplates by the plurality of catching protrusions and the plurality of catching grooves.

2. The fuel cell stack of claim 1, wherein the plurality of catching protrusions are integrated with the plurality of hook portions by partially processing a part of a respective hook portion of the plurality of hook portions.

3. The fuel cell stack of claim 1, wherein the plurality of catching protrusions are connected to a respective hook portion of the plurality of hook portions and is configured to be elastically movable from a first position at which the plurality of catching protrusions are accommodated in the plurality of catching grooves to a second position at which the plurality of catching protrusions is withdrawn out of the plurality of catching grooves.

4. The fuel cell stack of claim 1, further comprising:
a plurality of edge restriction parts provided on the outer surface of each of the plurality of endplates and configured to cover an edge of a respective hook portion of the plurality of hook portions,
wherein an edge accommodation space is defined between the plurality of edge restriction parts and a respective endplate and accommodates the edge of the respective hook portion.

5. The fuel cell stack of claim 4, wherein each of the plurality of edge restriction parts comprises:
a distal end restriction portion configured to cover a distal end of the respective hook portion;
a first lateral end restriction portion configured to cover a first lateral end of the respective hook portion; and
a second lateral end restriction portion configured to cover a second lateral end of the respective hook portion, and
wherein the distal end restriction portion, the first lateral end restriction portion, and the second lateral end restriction portion collectively define the edge accommodation space.

6. The fuel cell stack of claim 5, further comprising:
a first inclined guide portion provided on an outer surface of the distal end of the respective hook portion and configured to guide the respective hook portion to the edge accommodation space.

7. The fuel cell stack of claim 5, further comprising:
a second inclined guide portion provided on an inner surface of the distal end of the respective hook portion and configured to guide the respective hook portion to the edge accommodation space.

* * * * *